Aug. 23, 1955     C. E. BUELL     2,715,809

DEVICE FOR RECOVERING COTTON

Filed May 12, 1952     2 Sheets-Sheet 1

INVENTOR
C. E. BUELL

BY Ralph T. Bassett

ATTORNEY

Aug. 23, 1955  C. E. BUELL  2,715,809
DEVICE FOR RECOVERING COTTON
Filed May 12, 1952  2 Sheets-Sheet 2
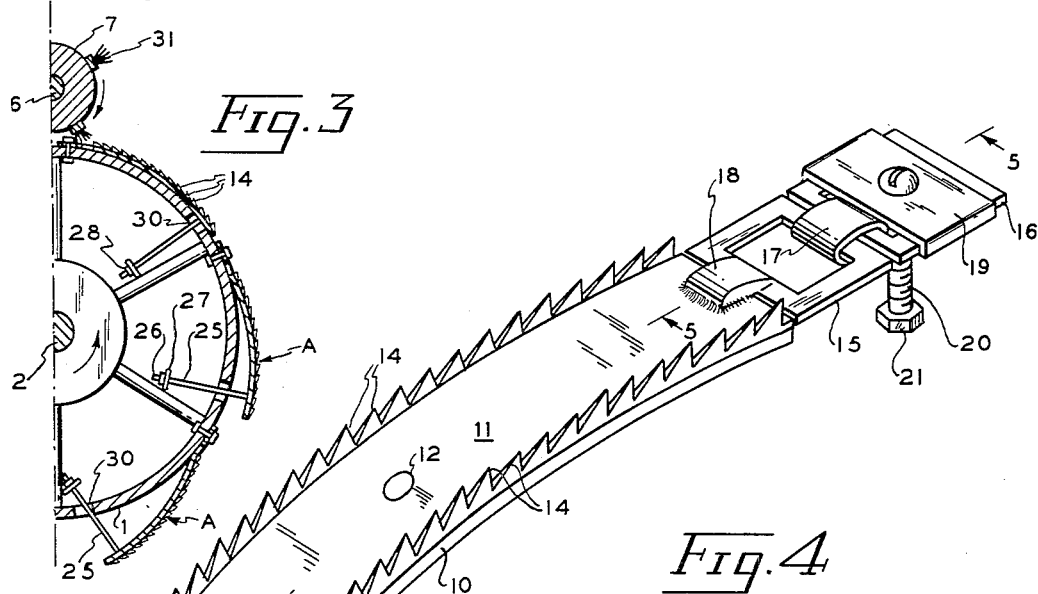
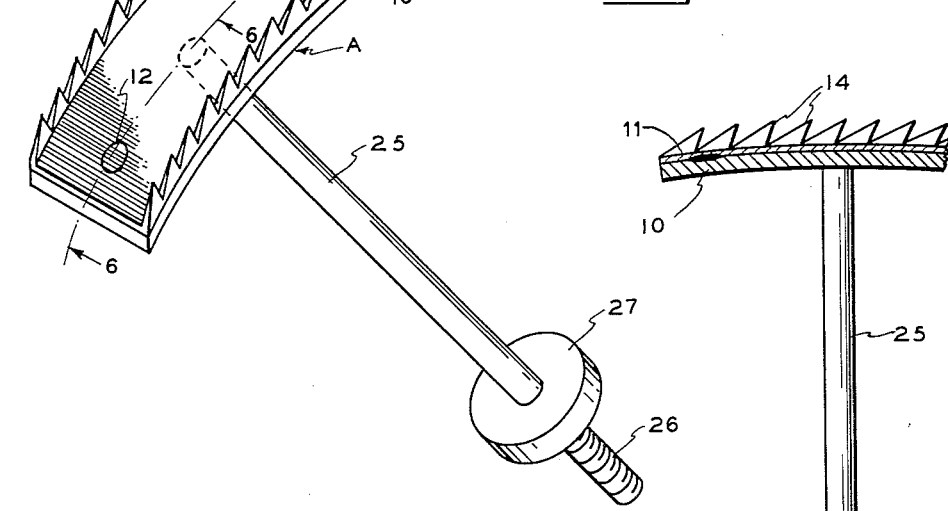
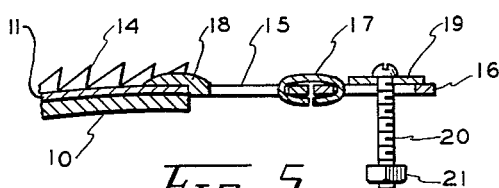
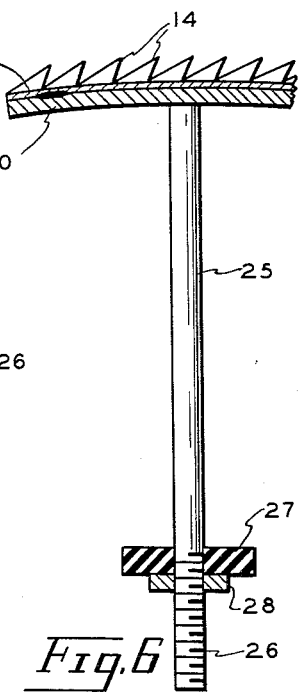
INVENTOR
C. E. BUELL
BY Ralph L. Bassett
ATTORNEY

United States Patent Office 2,715,809
Patented Aug. 23, 1955

2,715,809

DEVICE FOR RECOVERING COTTON

Charley E. Buell, Hinton, Okla.

Application May 12, 1952, Serial No. 287,339

12 Claims. (Cl. 56—28)

This invention relates to improvements in an apparatus for recovering waste cotton from the ground. In the harvesting of cotton, and in some instances due to weather conditions and to pretreatment of the cotton plant, a large quantity of cotton bolls becomes detached from the plant and falls to the ground and cannot be reclaimed readily by the conventional mechanical pickers. At this time there is no satisfactory means or method for reclaiming this waste of cotton from the ground, and the present apparatus is designed to accomplish this result by picking up from the ground, whether it be smooth or rough, the cotton bolls which may be scattered thereover.

Broadly, the invention comprehends the utilization of a rotating drum, the outer peripheral surface of which is provided with a plurality of loosely mounted, toothed gripping devices in the nature of hinged plates which swing away from the drum for engaging and gripping the bolls on the ground and subsequently return to substantially their peripheral seats to grip and maintain the recovered bolls and move them to a delivery position where the bolls are removed by a rapidly rotating brush, or otherwise, from which they are delivered to a hopper or other suitable means for delivery.

More specifically the invention broadly comprehends the use of a drum which is formed with a multiple series of peripherally arranged hinges to which are attached gripping segments in the nature of arcuate steel plates formed with marginal teeth, the plates being hinged at one end and having weighted means at the other end for the shifting of the plates on their hinges to gripping and releasing positions.

Further objects of the invention will more clearly hereinafter appear by reference to the accompanying drawings forming a part of the application in which like characters of reference designate corresponding parts throughout the several views, in which:

Fig. 3 is a fragmentary elevational view with parts broken away and shown in section of the invention;

Fig. 4 is an enlarged perspective view of one of the gathering elements and its hinged support;

Fig. 5 is a fragmentary transverse section through the hinge on line 5—5 of Fig. 4; and Fig. 6 is a fragmentary transverse section on line 6—6 of Fig. 4.

The present disclosure comprehends merely the pick-up mechanism, and is not intended to include a specific driving means or the arrangement of the pick-up mechanism in connection with a combine, tractor equipment, or other power unit, it being obvious to one skilled in the art that the pick-up unit itself could be utilized by either being pushed or pulled from any desirable source of power.

Figure 1:
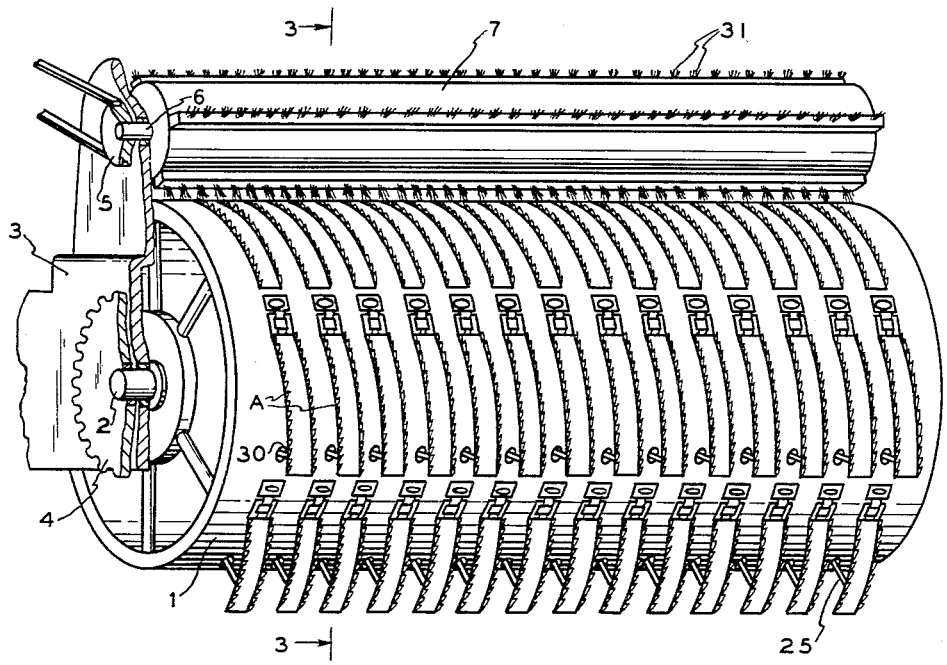
Fig. 1 is a perspective view of the invention with parts broken away and shown in section.
Figure 2:
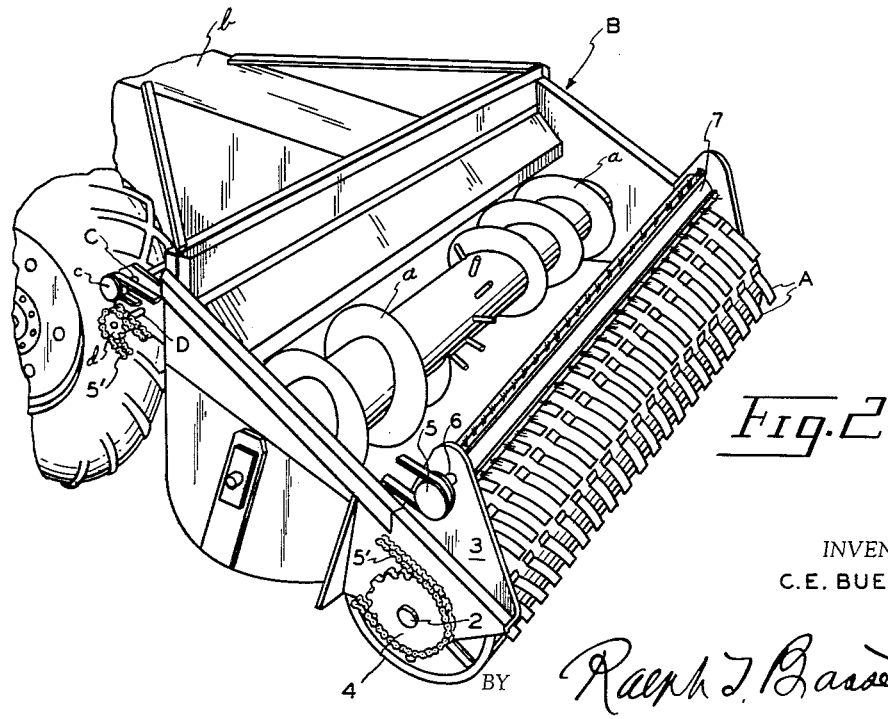
Fig. 2 is a perspective view on a reduced scale showing the invention attached to the front end of a combine.

In Fig. 1 the structure is shown to include a drum 1 mounted on a shaft 2, the shaft being supported in suitable bearings in a frame element 3, in the present illustration comprehending the front part of a combine assembly as more clearly shown in Fig. 2. The shaft 2 has mounted thereon the sprocket wheel 4 for driving connection with sprocket gear $d$ on the drive shaft D as will be more fully described. Mounted above the drum 1 is the shaft 6 supporting the brush drum 7, the shaft 6 having V-pulley 5 at its end for driving association with the V-pulley $c$ on the power shaft C as will be further hereinafter described.

It is to be understood that the specific form of power application will be modified in accordance with use of the device and that the brush and the pick-up drum of the present assembly is driven from a single shaft connected to the usual power take-off or as shown in the present illustration, separate shafts may be provided to deliver power to the brush and drum, respectively.

The drum 1 has attached about its outer surface a multiple series of sawtooth cotton pick-up devices A, the details of which in their present form are best shown in Figs. 4, 5 and 6. In Figs. 4 and 5, it will be seen that the cotton pick-up devices include a backing plate 10, of generally arcuate shape to conform to a portion of the periphery of the drum, the backing plate 10 being relatively thick and forming a support for the arcuate toothed strip 11 which conforms in size and shape to the backing plate 10 and is secured thereto by rivets 12 or other similar means. The strip 11 is formed at its longitudinal marginal edges with sawteeth 14 of an appropriate length and relatively sharp as indicated in the drawing so as to present prongs suitable for engaging the cotton of the boll in a hooked association and retaining the same as the drum rotates, it being noted that the actual travel of the boll from the ground to the point of release or discharge generally comprehends a movement of 180°, although this is a matter of convenience and the point of discharge could be modified to provide for the release of the trapped bolls at a point more suitable for handling and discharge to the hopper or conveying mechanism provided for the removal of the material collected. For mounting the pick-up elements A about the drum, a hinge is provided and includes the links 15 and 16, these links being strapped together by strap 17, and the link 15 which has one edge immediately adjacent the end of the pick-up device A is welded thereto by a connecting lug 18. It will be noted that the connecting lug 18 between the link 15 and the pick-up device 10 comprehends a structure which will permit replacement or substitution of a new toothed strip 11 which can be readily secured to the backing plate 10. The link 16 of the hinge assembly is clamped by a U-shaped clamp plate 19 and bolt 20 with its nut 21 to the drum 1 with the bolt positioned within the drum and obviously readily accessible through the ends of the drum body for adjustment or replacement, as the case may be.

The backing plate 10 for each of the pick-up devices A has secured to it adjacent its free end, an elongated guide rod or shaft 25, the connection between the backing plate 10 and the shaft 25 being made by welding or any suitable means insuring that the rod be rigidly fixed in position. The rod 25 is relatively heavy and is threaded at its free end 26 and on the free end of the rod for adjustment along the threaded portion is a rubber washer 27 of doughnut form secured thereon by the nut 28 which is properly threaded for threaded engagement with the threads 26 at the free end of the shaft 25.

Referring now to Fig. 3 which is a partial transverse section through the drum 1, it will be seen that the hinged portion of the pick-up units A are bolted in a multiple series about the periphery and at a point in the drum where the pick-up structures will overlie the drum body, openings 30 are formed of such a diameter as to allow the weighted guide rods 25 to swing freely during the outward movement of the pick-up structure A on its hinge. At the same time, the openings 30 are so proportioned with respect to the diameter of the washer element 27 that the washer element will not pass through the openings but will engage the inner face of the drum about the openings and act as stops to limit the swinging movement of the pick-up devices A on their hinges.

Still referring to Fig. 3 it will be seen that the rotation of the main drum 1 will be anti-clockwise and that the pick-up assemblies A in their movement with the drum have their hinged point lowermost which leaves the structures free to swing outwardly on their hinges substantially before they are moved to pick-up position which is during that period when the pick-up structures are traveling in an arc substantially tangent to the earth's surface. The outward movement of the units A is preferably adjusted by the adjusting nut 28 so that the outer free end portion of each of the units will approximately contact the earth's surface. The fact that the earth's surface may be irregular is not important because the segments A are at all times free to move upwardly towards the drum. It is intended that the supporting wheels for the drum 1 will be of such a diameter as to so space the drum from the earth's surface that an operating clearance will be provided such as to secure maximum pick-up effect of the mechanisms A as regards the cotton bolls. In order to insure this operation it will be seen that it is intended that the pick-up segments A will in their lowermost points effect a substantial engagement between the cotton bolls and the teeth 14 to insure the snagging of the cotton bolls by several of the teeth. It is, of course, well known that the structure of cotton in its boll state due to the entanglement of the fibers is quite susceptible to entanglement with a structure such as disclosed in this application. As previously stated the teeth are generally of the design of sawteeth and may if found desirable be alternately deflected as in a saw setting to obtain increased snagging effect.

In Fig. 2 the device is shown as an attachment to the front of a conventional combine, and will be positioned ahead of the combine. In this disclosure of the use of the invention, the brush 7 will rotate clockwise to deliver the cotton from the pickup drum to the oppositely spiraled feed screws $a$ contained in the combine structure B and from the screws delivered to the usual conveying mechanism contained in the take-off conduit $b$. To supply power to the present assembly separate drive shafts may be provided as at C and D, the upper drive shaft C having the small V-pulley 5 for a V-belt connection with the V-pulley $c$ on the shaft 6 of the brush 7. The lower shaft D is provided with a gear $d$ for driving connection with the gear 4 on the end of shaft 2 of the separator drum by means of the sprocket chain 5'. It is to be understood that the shafts C and D may be driven separately or from a common drive shaft from any suitable source of power such as the conventional power take-off provided in combines and other machinery of like nature. It is also understood that the specific form of driving mechanism may be changed in accordance with requirements as where the device is used as an attachment to tractors. As an attachment for a tractor or other power apparatus the present invention may either be arranged ahead or behind the power structure and connected from any desirable power take-off normally provided in such assemblies. The specific driving mechanism forms no part of the present invention, it being understood that the instant invention is adaptable for use in connection with general farming tractors and other equipment which may be available.

As the cotton is snagged it is lifted, in the present illustration, to a point substantially intersected by a line through the axle of the drum and during this movement the pick-up elements due to the hinge of the unit having assumed an upper position, the weight of the structure will cause each of the units to again return into snug engagement with the drum. Although, in some instances, portions of the boll which is picked up will project between the back of the pick-up unit and the drum, and in this instance the boll will merely be further clamped by the tendency of the unit to swing on its hinge against the drum. At the vertical point indicated heretofore, a brush 7 is provided, the brush extending the full length of the drum and having a series of peripherally spaced brush elements 31, which during the rotation of the brush, sweep the cotton bolls from their engagement with the teeth of the segmental pick-up devices A. It will be noted that the teeth of the segments project generally rearwardly towards the hinges of the segments and by this arrangment the pick-up facilities of the teeth are at their maximum on the downward movement of the pick-up elements but when the segments are moved to the upper position with the drum structure, the opposite rotation of the brush from the direction of travel of the drum results in the lower brush swinging in the direction of projection of the teeth and clearly facilitates the removal of the cotton bolls trapped by the teeth and permits a clearance of the structure quite readily by the apparatus shown. The cotton swept from the pick-up mechanism described may be thrown by the cleaning brush 7 into a hopper indicated generally at B, or these cotton bolls may be projected into a box, and when the device is utilized in connection with a pneumatic cotton picking mechanism may be readily removed from a box or similar chamber by suction or other means provided.

While the main features of the development are disclosed in the present application, it will be obvious to one skilled in the art that the details of construction such as the driving mechanism, the mounting mechanism for the apparatus, and the delivery mechanism for the recovered bolls can be modified in accordance with requirements.

What I claim is:

1. In a device of the class described, a supporting structure including supporting wheels, a driven drum, a plurality of toothed strips hingedly supported about the periphery of the drum, said strips being formed with a multiplicity of teeth on their outer faces, and means connecting the free end portions of said strips and said drum for limiting the swinging movement of said strips on their hinges.

2. The structure of claim 1 characterized in that the strips are in the nature of segments and are provided with teeth along their longitudinal marginal edges.

3. The structure of claim 1 characterized in that the strips are provided at their free ends with rods which project into the drum and means are provided adjustably mounted on the end portions of the rods for limiting the movement of the strips and the rods.

4. The structure of claim 1 characterized in that the strips are provided with backing faces and the elements carrying the teeth are removably secured to the backing faces.

5. The structure of claim 1 characterized in that the connecting means for limiting the swinging movement of the strips on their hinges is adjustable to vary the swinging movement of the strips.

6. In an apparatus for recovering waste cotton from the ground, a wheel supported frame, a rotatable drum mounted in the frame and of a size and so mounted that the periphery of the drum is normally spaced from the surface of the ground, a multiplicity of pick-up plates in spaced circumferentially arranged rows around the outer periphery of the drum, said plates being relatively narrow and removably fixed to the drum in end to end relation, and a multiplicity of teeth projecting from the outer faces of the plates.

7. The structure of claim 6 characterized in that the plates are hinged at one end for free swinging movement laterally of the drum periphery and are so constructed and arranged as to normally be seated against the drum by gravity when overlying the drum structure.

8. The structure of claim 6 characterized in that the pick-up plates include a backing structure and a toothed outer lamina, the latter having marginal teeth projecting outwardly therefrom.

9. The structure of claim 6 characterized in that rotating brush means are provided for removing the recovered cotton from the teeth of the pick-up members.

10. In an apparatus for recovering cotton bolls from the ground, including a mobile frame, a drum supported in the frame above the ground, driving means for the drum, and a plurality of plates each having a curved outer surface and being pivotally supported about the outer peripheral surface of the drum, said plates being shiftable with respect to the peripheral face of the drum and having projecting from their outer curved surfaces a plurality of teeth.

11. In an apparatus for recovering cotton bolls from the ground, including a mobile frame, a drum supported in the frame above the ground, driving means for the drum, and a plurality of plates each having a curved outer surface and pivotally supported about the outer peripheral surface of the drum, said plates being shiftable with respect to the peripheral face of the drum and having projecting from their outer curved surfaces a plurality of teeth.

12. In an apparatus for recovering cotton bolls or the like from the ground, including a mobile frame, a body structure including a traveling surface adapted for movement in close proximity to the ground, said traveling surface including rigid hinged arms automatically shiftable for following the undulations in the ground surface, said arms being formed with a multiplicity of outwardly projecting teeth, a rotating brush carried by the frame for removing articles collected by the teeth, said brush being rotated in a direction reverse to the direction of travel of said body structure.

References Cited in the file of this patent

UNITED STATES PATENTS

| | | |
|---|---|---|
| 1,439,266 | Shaw | Dec. 19, 1922 |
| 1,993,426 | Kent | Feb. 17, 1931 |
| 2,155,543 | Grignolo | Apr. 25, 1939 |
| 2,528,102 | Willis | Oct. 31, 1950 |
| 2,608,816 | Lembke | Sept. 2, 1952 |